United States Patent
Smet et al.

(10) Patent No.: US 10,698,744 B2
(45) Date of Patent: Jun. 30, 2020

(54) ENABLING THIRD PARTIES TO ADD EFFECTS TO AN APPLICATION

(71) Applicant: Facebook, Inc., Menlo Park, CA (US)

(72) Inventors: Stef Marc Smet, London (GB); Michael Slater, Nottingham (GB); Michael Philip Arcuri, Seattle, WA (US); Joshua Ryan Williams, Seattle, WA (US); Karthik Subramanyam, Seattle, WA (US); Bo Yin, Seattle, WA (US)

(73) Assignee: FACEBOOK, INC., Menlo Park, CA (US)

( * ) Notice: Subject to any disclaimer, the term of this patent is extended or adjusted under 35 U.S.C. 154(b) by 170 days.

(21) Appl. No.: 15/488,238

(22) Filed: Apr. 14, 2017

(65) Prior Publication Data

US 2018/0300185 A1    Oct. 18, 2018

(51) Int. Cl.
*G06F 9/54* (2006.01)
*G06F 9/445* (2018.01)
(Continued)

(52) U.S. Cl.
CPC .......... *G06F 9/541* (2013.01); *G06F 3/04842* (2013.01); *G06F 9/44526* (2013.01);
(Continued)

(58) Field of Classification Search
CPC ... G06F 9/541; H04N 21/2743; G11B 27/031; G06Q 50/01
(Continued)

(56) References Cited

U.S. PATENT DOCUMENTS

| 8,887,178 B1 | 11/2014 | Browne et al. |
| 8,972,485 B1 * | 3/2015 | French ................. G06F 9/5044 709/203 |

(Continued)

FOREIGN PATENT DOCUMENTS

| EP | 2287739 A2 | 2/2011 |
| KR | 1020140051850 A | 5/2014 |

OTHER PUBLICATIONS

J. Sonmez, "The Programmer's Guide to Working on a Team," published Mar. 27, 2017, downloaded from https://simpleprogammer.com/working-on-a-team (Year: 2017).*

(Continued)

*Primary Examiner* — Jennifer N To
*Assistant Examiner* — Eric J Yoon
(74) *Attorney, Agent, or Firm* — Kilpatrick Townsend & Stockton LLP

(57) ABSTRACT

Techniques that enable a third party to author and add functionality to a target application. A third party may create or author a script that encodes the functionality to be added to the target application. The script may then be provided to and executed by the target application, where execution of the script causes the functionality to be added to the target application. In certain embodiments, the added functionality may be in the form of effects that are output via the target application when the script is executed by the target application. The effects may include audio-visual effects that are displayed or output by the target application and may also include displaying data provided by a third party.

20 Claims, 21 Drawing Sheets

(51) Int. Cl.
*G06F 9/451* (2018.01)
*G06F 3/0484* (2013.01)
*G06Q 50/00* (2012.01)
*H04N 5/232* (2006.01)

(52) U.S. Cl.
CPC ............ *G06F 9/451* (2018.02); *G06Q 50/01* (2013.01); *H04N 5/23293* (2013.01)

(58) Field of Classification Search
USPC ........................................................ 715/719
See application file for complete search history.

(56) References Cited

U.S. PATENT DOCUMENTS

| | | | |
|---|---|---|---|
| 9,716,909 B2* | 7/2017 | Hill | .................... H04N 21/2743 |
| 9,754,355 B2* | 9/2017 | Chang | ..................... G06F 16/50 |
| 2001/0004417 A1 | 6/2001 | Narutoshi et al. | |
| 2004/0090458 A1 | 5/2004 | Yu et al. | |
| 2008/0155633 A1 | 6/2008 | Watson | |
| 2011/0066962 A1 | 3/2011 | Nash et al. | |
| 2013/0272679 A1 | 10/2013 | Cavalcanti | |
| 2013/0326377 A1* | 12/2013 | Yu | ........................ G11B 27/031 715/763 |
| 2015/0058733 A1* | 2/2015 | Novikoff | .............. G11B 27/031 715/723 |
| 2015/0082341 A1 | 3/2015 | Rosenbaum et al. | |

OTHER PUBLICATIONS

"How Computers Work: the CPU and Memory," webpage, published Apr. 20, 2016, downloaded from https://homepage.cs.uri.edu/faculty/wolfe/book/Readings/Reading04.htm (Year: 2016).*

K. Hines, Social Media Examiner website, "How to Create a Snapchat Geofilter for Your Event," published Feb. 25, 2016, downloaded at https://www.socialmediaexaminer.com/how-to-create-a-snapchat-geofilter-for-your-event/ (Year: 2016).*

YouTube video, user Simple Software Tutorials, "How to Use Snapchat Filters," published Apr. 1, 2017, downloaded at https://www.youtube.com/watch?v=XxGwtlvEtmY (Year: 2017).*

PCT/US2017/028012, "International Search Report and Written Opinion", dated Jan. 18, 2018, 18 pages.

EESR dated Jun. 25, 2018 issued in corresponding European Patent Appln. No. 17207084.9.

* cited by examiner

100

USER IS USING A THIRD PARTY APPLICATION EXECUTING ON A USER DEVICE
110

USER SELECTS SPECIAL SHARE BUTTON IN THE THIRD PARTY APPLICATION
120

DISPLAY ON THE USER DEVICE SWITCHES FROM THE THIRD PARTY APPLICATION GUI TO A TARGET APPLICATION GUI
130

ONE OR MORE MEDIA EFFECTS AUTHORED BY A THIRD PARTY ARE OUTPUT VIA THE TARGET APPLICATION
140

USER INTERACTS WITH THE TARGET APPLICATION
150

DOES INPUT CAUSE EXIT FROM TARGET APPLICATION?
160
NO
YES

DISPLAY ON THE USER DEVICE SWITCHES FROM THE TARGET APPLICATION GUI TO THE THIRD PARTY APPLICATION GUI
170

RECEIVE, BY A THIRD PARTY APPLICATION, AN INDICATION OF A SELECTION OF A SPECIAL BUTTON
610

DETERMINE, BY THE THIRD PARTY APPLICATION, THIRD PARTY DATA TO SEND TO TARGET APPLICATION
620

SEND, BY THE THIRD PARTY APPLICATION, THE THIRD PARTY DATA TO THE TARGET APPLICATION
630

ENABLE, BY THE THIRD PARTY APPLICATION, THE DEVICE TO SWITCH FROM DISPLAYING THE USER INTERFACE OF THE THIRD PARTY APPLICATION TO DISPLAYING THE USER INTERFACE OF THE TARGET APPLICATION
640

RECEIVE, BY THE THIRD PARTY APPLICATION, A SIGNAL FROM THE CAMERA APPLICATION TO BECOME THE ACTIVE APPLICATION FOR THE USER DEVICE
650

RECEIVE A SIGNAL FROM A THIRD PARTY APPLICATION EXECUTING ON A DEVICE
710

CAUSE A TARGET APPLICATION EXECUTING ON THE DEVICE TO BE AN ACTIVE APPLICATION FOR THE DEVICE
720

IDENTIFY A SCRIPT BASED ON THE SIGNAL
730

EXECUTE THE SCRIPT CAUSING ONE OR MORE EFFECTS TO BE OUTPUT BY THE TARGET APPLICATION
740

RECEIVE A USER INTERACTION
750

DOES INPUT CAUSE EXIT FROM TARGET APPLICATION?
760

NO

YES

CAUSE THE CAMERA APPLICATION TO SWITCH TO THE THIRD PARTY APPLICATION
770

FIG. 7

ENABLING THIRD PARTIES TO ADD EFFECTS TO AN APPLICATION

BACKGROUND

Today, social media applications allow users to create, edit, and share content with other users. For example, a social media application can allow third party users or third party applications to publish content to the social media application. However, the social media application typically restricts the format of the content being published on the social media application to a format created by parties associated with the social media application, such as the programmers of the social media applications. In addition, there is no ability for third parties to add or enhance the functionality of the social media application. These limitations also exist in other applications, such as various audio-visual applications.

SUMMARY

The present disclosure describes techniques that enable a third party unrelated to an application to add functionality authored by the third party to the application. In certain embodiments, a third party may create or author a script that encodes the functionality to be added to the application. The script may then be provided to and executed by the application, where execution of the script causes the functionality to be added to the application.

In certain embodiments, the added functionality may be in the form of one or more effects that are output by the application when a corresponding script is executed by the application. The one or more effects may include audio-visual effects that are displayed by the application to which the one or more effects are added. In some embodiments, the one or more effects may also include display of data provided by a third party in the application to which the one or more effects are added. In such an embodiment, the script provided by the third party application may identify the data to be displayed.

In one illustrative example, the application to which the one or more effects are added (i.e., the target application) by the third party may be a camera application that is configured to output audio-visual information (e.g., images, video information, audio information, or the like) captured by one or more audio-video capture devices (e.g., a camera, a microphone, or the like) on a user device. In such an example, a script authored by a third party may be made available to the camera application.

When executed by the camera application, the one or more effects corresponding to the script may be output through the camera application, such as via a user interface of the camera application. For example, in one embodiment, the one or more effects may be mixed with the media content (e.g., an image, a video, an audiovisual stream, or the like) being captured and output by the camera application. In such an example, the one or more effects and the media content may be together output by the camera application. The media content of the target application is augmented by the one or more effects (sometimes referred to as a media effect). In certain embodiments, the camera application may be part of a social media application such as a Facebook™ application.

In certain embodiments, according to an example workflow, a third party application may be executing on a user's device, such as the user's mobile device. The third party application may provide a user interface (e.g., a graphical user interface (GUI)) that enables a user to select a special share button provided by the third party application. The selection of the special share button may cause a message to be communicated from the third party application to a target application (e.g., a camera application). The camera application may then, based on the received message, determine a script that is associated with the third party application. The script may be authored by the same third party as the third party application or by some other third party. In some examples, when referring to a third party for authorship, this disclosure is referring to a party other than the party associated with the camera application.

In certain embodiments, the message that is received by the camera application may include the script. In some other embodiments, the message received by the camera application may include information that is used by the camera application to obtain the script. The script may then be executed by the camera application causing the one or more effects corresponding to the script to be output by the camera application. In some embodiments, the script may be executed within a sandbox container within the camera application so that the script is cordoned off from and does not have access to any information of the social media application.

From the perspective of the user using the third party application, upon selection of the special share button, the display on the user's device is switched from a user interface of the third party application to a user interface of the camera application. The user interface of the camera application can then display the one or more effects corresponding to the executed script. The user can then interact with the camera application to perform one or more actions with respect to the media content mixed with the media effect, such as cancel, share, save, interact with the media content mixed with the media effect, or the like. The camera application may also provide an exit button, which when selected by the user, causes the camera application to close and the user interface of the third party application to be redisplayed on the user's device.

In certain embodiments, the one or more effects may include audio-visual effects, such as, without limitation: audio sounds (e.g., happy birthday music, balloons popping, crowd cheering, etc.) and visual effects (e.g., streamers, floating balloons, a birthday cap superimposed on to a person's head, etc.). The one or more effects may also include the display of data provided by a third party such as a game score, a number of miles run by a runner, etc. In some embodiments, the data to be displayed may be sent from the third party application to the camera application in response to the selection of the special share button in the third party application by a user. In some other embodiments, the script encoding the one or more effects may contain the data or may contain pointers or references to the data. These pointers or references may then be used by the target application to download the corresponding data when the script is executed by the target application and the data may then be displayed by the target application as part of outputting the one or more effects.

In certain embodiments, multiple scripts, possibly provided by multiple third parties may be available for execution by the target application. For example, when the target application receives a message from a third party application (e.g., a message that is communicated when a user of the third party application selects a special share button provided by the third party application), the target application may identify multiple scripts from one or more third parties that are available for execution in response to receiving the message. In such a scenario, the target application may provide user-selectable representations for each of the available scripts, where the representations may be in the form of thumbnails, icons, buttons, etc. The user can then select a particular representation (and as a result a particular set of one or more effects), a particular script corresponding to the selected representation is then executed by the target application, and the one or more effects resulting from execution of the particular script are output by a user device executing the target application.

Techniques described in this disclosure enable a third party to add functionality to a target application. The functionality is added without having to change the target application code or to recompile the target application. In certain embodiments, the target application can be invoked via a third party application provided by a third party. Upon invocation, such as via a share button provided by the third party application, a user interface of the target application is displayed and a script authored by a third party is executed by the target application causing the one or more effects corresponding to the executed script to be output via the user interface of the target application. The user can then interact with the target application. The user interface of the target application may provide a user-selectable option, which when selected by the user, causes the target application to close and the display to be reverted back to the third party application. These and other examples of the disclosure, along with many of its advantages and features, are described in more detail in conjunction with the text below and attached figures.

The terms and expressions that have been employed in this disclosure are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although certain concepts and techniques have been specifically disclosed, modification and variation of these concepts and techniques may be resorted to by those skilled in the art, and that such modifications and variations are considered to be within the scope of the systems and methods as defined by this disclosure.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will be described in more detail below in the following specification, claims, and accompanying drawings.

BRIEF DESCRIPTION OF THE DRAWINGS

Illustrative embodiments are described in detail below with reference to the following figures:

FIG. 1 depicts an example workflow showing a user's experience according to an embodiment;

FIG. 6 is a simplified flowchart depicting processing performed by a third party application according to certain embodiments;

FIG. 7 is a simplified flowchart depicting processing performed by a target application according to certain embodiments;

DETAILED DESCRIPTION

Figure 2A:
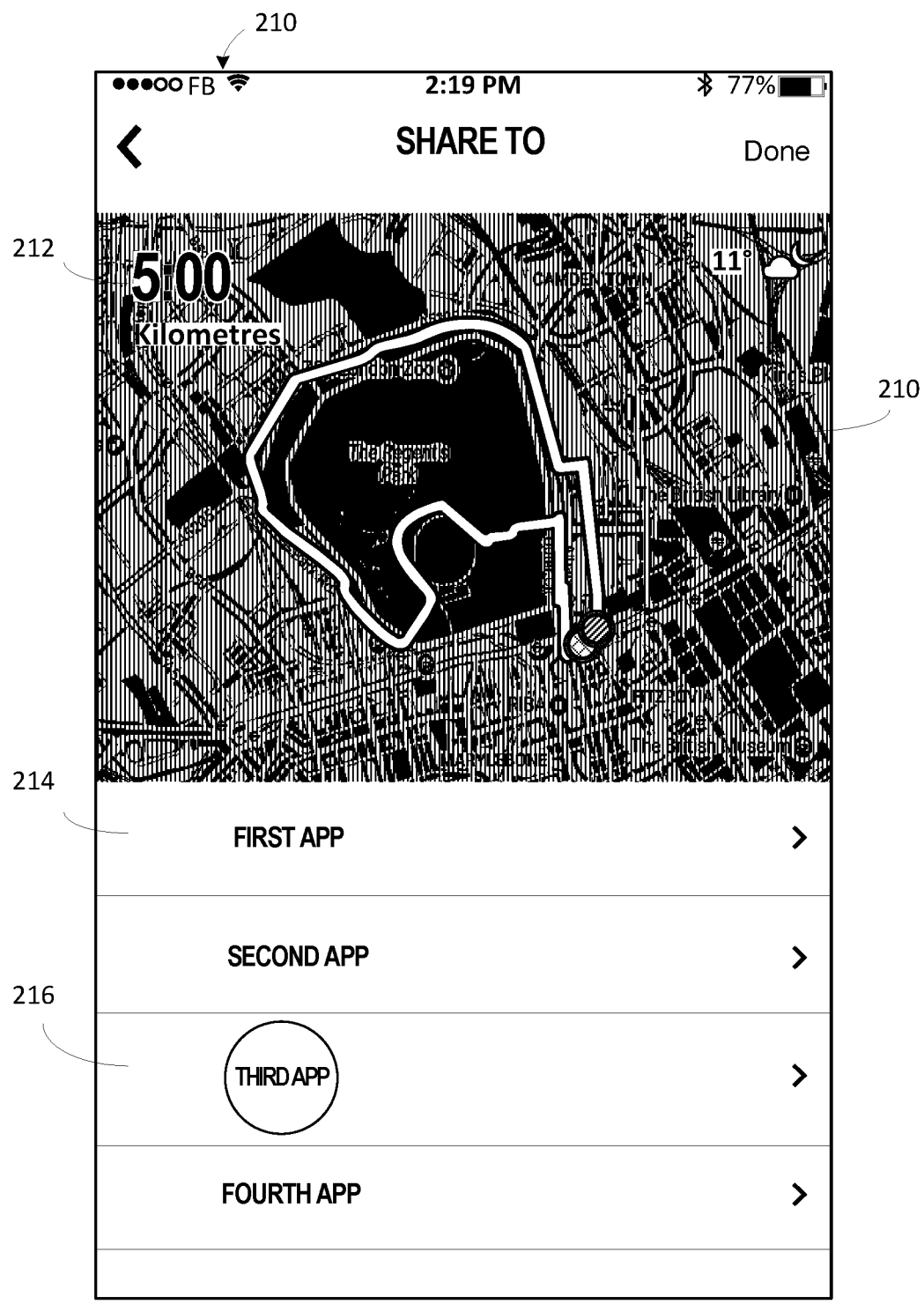
FIG. 2A depicts a third party application that the user may use to track the user's running activity.

In the following description, for the purposes of explanation, specific details are set forth in order to provide a thorough understanding of examples of the disclosure. However, it will be apparent that various examples may be practiced without these specific details. For example, circuits, systems, networks, processes, and other components may be shown as components in block diagram form in order to not obscure the examples in unnecessary detail. In other instances, well-known circuits, processes, algorithms, structures, and techniques may be shown without necessary detail in order to avoid obscuring the examples. The figures and description are not intended to be restrictive.

The ensuing description provides examples only, and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the disclosure as set forth in the appended claims.

Also, it is noted that individual examples may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable storage medium or computer-readable storage medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. One or more processors may execute the software, firmware, middleware, microcode, the program code, or code segments to perform the necessary tasks.

Systems depicted in some of the figures may be provided in various configurations. In some examples, the systems may be configured as a distributed system where one or more components of the system are distributed across one or more networks such as in a cloud computing system.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Techniques are described that enable a third party (unrelated to an application) add functionality authored by the third party to the application. In certain embodiments, a third party may create or author a script that encodes the functionality to be added to the application. The script may then be provided to and executed by the application, where execution of the script causes the functionality to be added to the application.

In certain embodiments, the added functionality may be in the form of one or more effects that are output when the corresponding script is executed by the application. The one or more effects may include audio-visual effects that are displayed by the application to which the one or more effects are added. In some embodiments, the one or more effects may also include displaying data corresponding to a third party application in the application to which the one or more effects are added. In such an embodiment, the script provided by the third party application may identify the data to be displayed.

In one illustrative example, the application to which the one or more effects are added (i.e., the target application) may be a camera application that is configured to output audio-visual information captured by one or more audio-video capture devices such as a video stream captured by a camera on a device. In such an example, a script authored by a third party may be made available to the camera application. When executed by the camera application, the script may cause the one or more effects corresponding to the script to be output through the camera application, such as via a user interface of the camera application. The one or more effects may include audio-visual effects and/or data (corresponding to the third party) that is to be displayed. For example, in one embodiment, the one or more effects may be mixed with the media content (e.g., an image, a video, or an audiovisual stream) being captured. Then the one or more effects and the media content may be together output by the camera application. In some examples, the media content of the target application is augmented by the one or more effects. In certain embodiments, the camera application may be part of a social media application such as a Facebook™ application.

In certain embodiments, according to an example workflow, a third party application may be executing on a user's device, such as the user's mobile device. The third party application may provide a user interface that enables a user to select a special share button provided by the third party application. The selection of the special share button may cause a message to be communicated from the third party application to the target application (e.g., a camera application). The camera application may then, based on the received message, determine a script that is associated with the third party application. The script may be authored by the same third party as the third party application or by some other third party. In some examples, when referring to a third party for authorship, this disclosure is referring to a party other than the party associated with the camera application.

In certain embodiments, the message that is received by the camera application may include the script. In some other embodiments, the message received by the camera application may include information that is used by the camera application to identify a particular script. The particular script may then be executed by the camera application causing the one or more effects corresponding to the script to be output by the camera application.

From the perspective of the user using the third party application, upon selection of the special share button, the display on the user's device is switched from a user interface (e.g., graphical user interface (GUI)) of the third party application to a user interface (e.g., a GUI) of the camera application, and the GUI of the camera application can then display the one or more effects corresponding to the executed script. The user can then interact with the camera application to perform one or more actions to the media content mixed with the media effect, such as cancel, share, save, or the like. The camera application may also provide an exit button, which when selected by the user, causes the camera application to close and the user interface of the third party application to be redisplayed on the user's device.

In some embodiments, the script may be executed by the target application within a sandbox container so that the script is cordoned off from and does not have access to any information of the target application. A sandbox container is one way of ensuring that the script is executed within a controlled environment, without access to private information of the target application. Other techniques, besides execution within a sandbox, may also be used to isolate the execution of the script by the target application.

In some examples, the message from the third party application may first be sent to a social media application (such as a Facebook™ application), which can then in response send a second message to the target application such as the camera application, which then outputs the effects as described herein. In certain embodiments, the social media application can provide the camera application. In such an example, the camera application can be a process executed by the social media application. Alternatively, the target application may be a separate application from the social media application.

In certain embodiments, the one or more effects may include audio-visual effects such as, without limitations: audio sounds (e.g., happy birthday music, balloons popping, crowd cheering, etc.) and visual effects (e.g., streamers, floating balloons, a birthday cap superimposed on to a person's head, etc.). The one or more effects may also include display of data provided by a third party such as a game score, a number of miles run by a runner, etc. In some embodiments, the data to be displayed may be sent from the third party application to the camera application in response to the selection of the special share button in the third party application by a user. In some other embodiments, the script encoding the effects may contain the data or may contain pointers or references to the data. These pointers or references may then be used by the target application to download the corresponding data when the script is executed by the target application and the data may then be displayed by the target application as part of outputting the one or more effects.

In certain embodiments, multiple scripts, possibly provided by multiple third parties, may be available for execution by the target application. For example, when the target application receives a message from a third party application (e.g., a message that is communicated when a user of the third party application selects a special share button provided by the third party application), the target application may identify multiple scripts from one or more third parties that are available for execution in response to receiving the message. In such a scenario, the target application may provide user-selectable representations for each of the available scripts, where the representations may be in the form of thumbnails, icons, buttons, etc. The user can then select a particular representation (and as a result a particular set of effects). A particular script corresponding to the selected representation is then executed by the target application and the one or more effects resulting from execution of the particular script are output by the target application.

For purposes of this disclosure, the term "third party" is used to refer to an entity (e.g., person, company, provider, or the like) that is different from a provider of a target application. An application provided by a third party is referred to as a third party application, which is separate and different from the target application. For example, if the target application was an application provided by Facebook, Inc., another company other than Facebook, Inc. could be a third party.

FIG. 1 depicts an example workflow showing a user's experience according to an embodiment. The flow presented in FIG. 1 and described below is intended to be illustrative and non-limiting. The particular series of steps depicted in FIG. 1 is not intended to be limiting.

At 110, a user may be using an application (referred to as a third party application) executing on a user device (such as a computer, a mobile phone, or other electronic device). The third party application may provide a graphical user interface (GUI) that is displayed on the user's device and allows the user to interact with the third party application. An example of such a third party application and the GUI 200 displayed by the third party application is depicted in FIG. 2A, which shows a third party application that the user may use to track the user's running activity. As depicted in FIG. 2A, the third party application graphical user interface (GUI) may display a graphic 212 that illustrates a path that the user ran, an indication 214 of the distance run by the user, and also a special share button 218, which can be a user-selectable button.

Figure 2B:
FIG. 2B depicts a graphical user interface for the camera application with audio-visual media content captured by a front facing camera.

At 120, the user may select the special share button 218 in the third party application. Selection of the special share button 218 enables the user to share information from the third party application to a target application. For example, the target application may be a camera application that is configured to output audio-visual information (e.g., images, video information, audio information) captured by one or more audio-video capture devices (e.g., a camera, a microphone, or the like) on a user device. An example of such a camera application is shown in FIG. 2B. As shown in FIG. 2B, a graphical user interface 220 for the camera application is shown with audio-visual media content captured by a front facing camera.

At 130, as a result of selecting the special share button in 120, the display on the user's device is switched from the third party application's GUI to the target application's GUI. At 140, one or more effects authored by a third party are output via the target application. The one or more effects may include audio-visual effects such as, without limitations, audio sounds (e.g., happy birthday music, balloons popping, crowd cheering, etc.) and visual effects (e.g., streamers, floating balloons, a birthday cap superimposed on to a person's head, etc.). The one or more effects may also include displaying data provided by a third party such as a game score, a number of miles run by a runner, etc. The one or more visual and data display effects may be output via the GUI of the target application and one or more audio effects may be output via an audio output device (e.g., a speaker) of the user's device under control of the target application. In certain embodiments, the one or more effects may be output along with (e.g., mixed with) the media content corresponding to the target application.

Figure 2C:
FIG. 2C depicts one or more effects being output via a camera application.

For example, FIG. 2C depicts the one or more effects being output via a camera application. FIG. 2C depicts a GUI 220 of a camera application showing media content captured and output by the camera application. Additionally, one or more effects 230 are also displayed via GUI 220 mixed in with the media content of the camera application. In this manner, the content of the camera application is augmented by the one or more effects 230. In the example depicted in FIG. 2C, the one or more effects 230 include displaying information from the third party application. For example, as shown in FIG. 2C, the one or more effects 230 include a graphic 232 showing the route run by the user and data 234 indicating the distance (e.g., number of miles) run by the user. Comparing this to FIG. 2A, it can be seen that this information is from the third party application.

At 150, the user may interact with the target application. For example, the user may take pictures (e.g., a frame), capture videos (e.g., one or more frames), share the pictures and/or videos, etc. using the camera application. These pictures and videos may include the one or more effects.

In certain embodiments, the third party application may provide a user selectable option that enables the user to close the target application and revert back to the third party application. At 160, the user may select this option to exit the target application. In some examples, the pictures, videos, or a preview of either can be sent to the third party application. At 170, in response to the user selecting the exit option in 160, the display on the user's device switches from the target application's GUI back to the third party application's GUI. The target application may be closed and the third party application may display the pictures, videos, or the preview of either that was sent to the third party application.

Figure 2D:
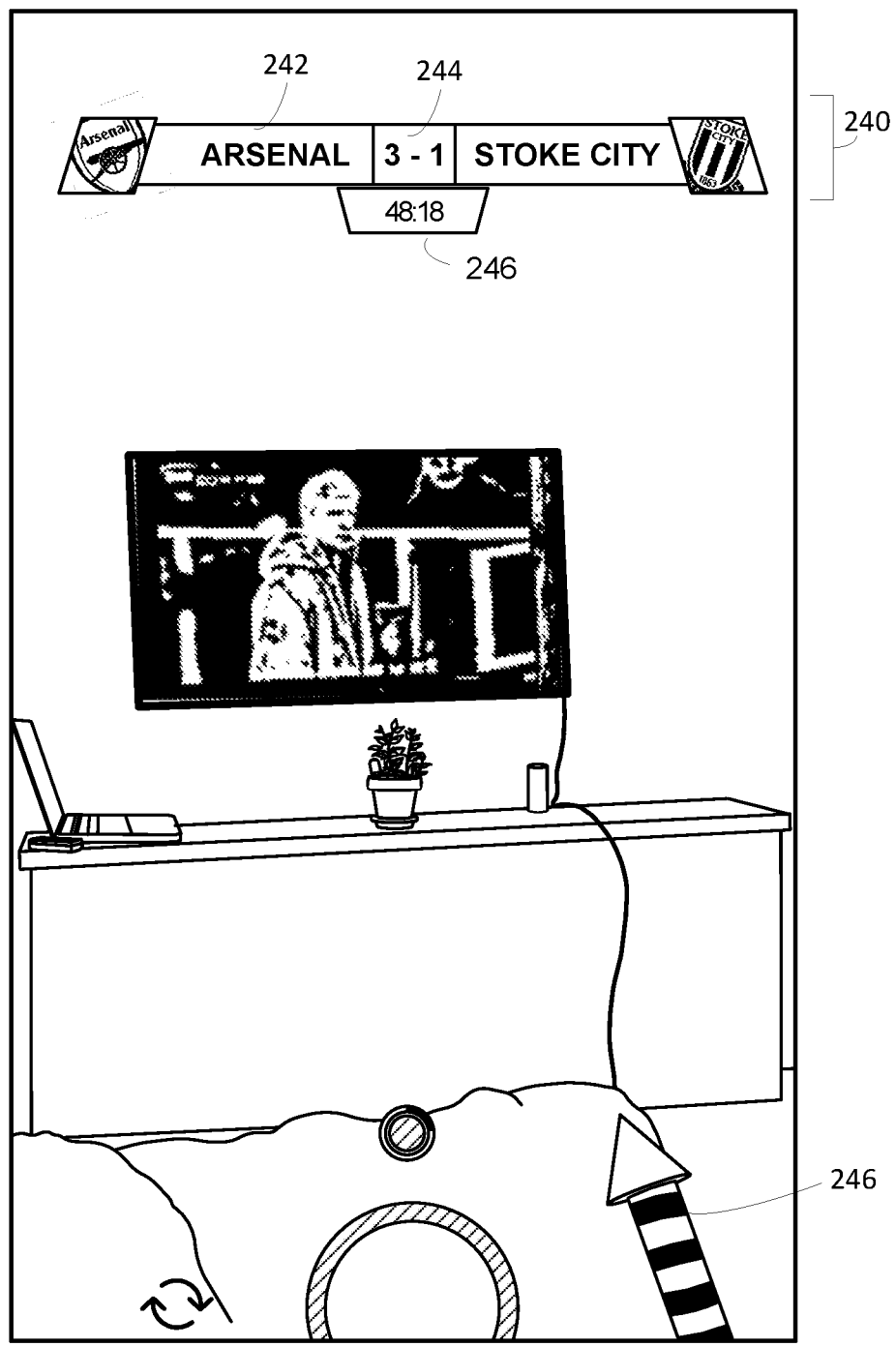
FIG. 2D depicts another example of one or more effects being output via a camera application.
Figure 2E:
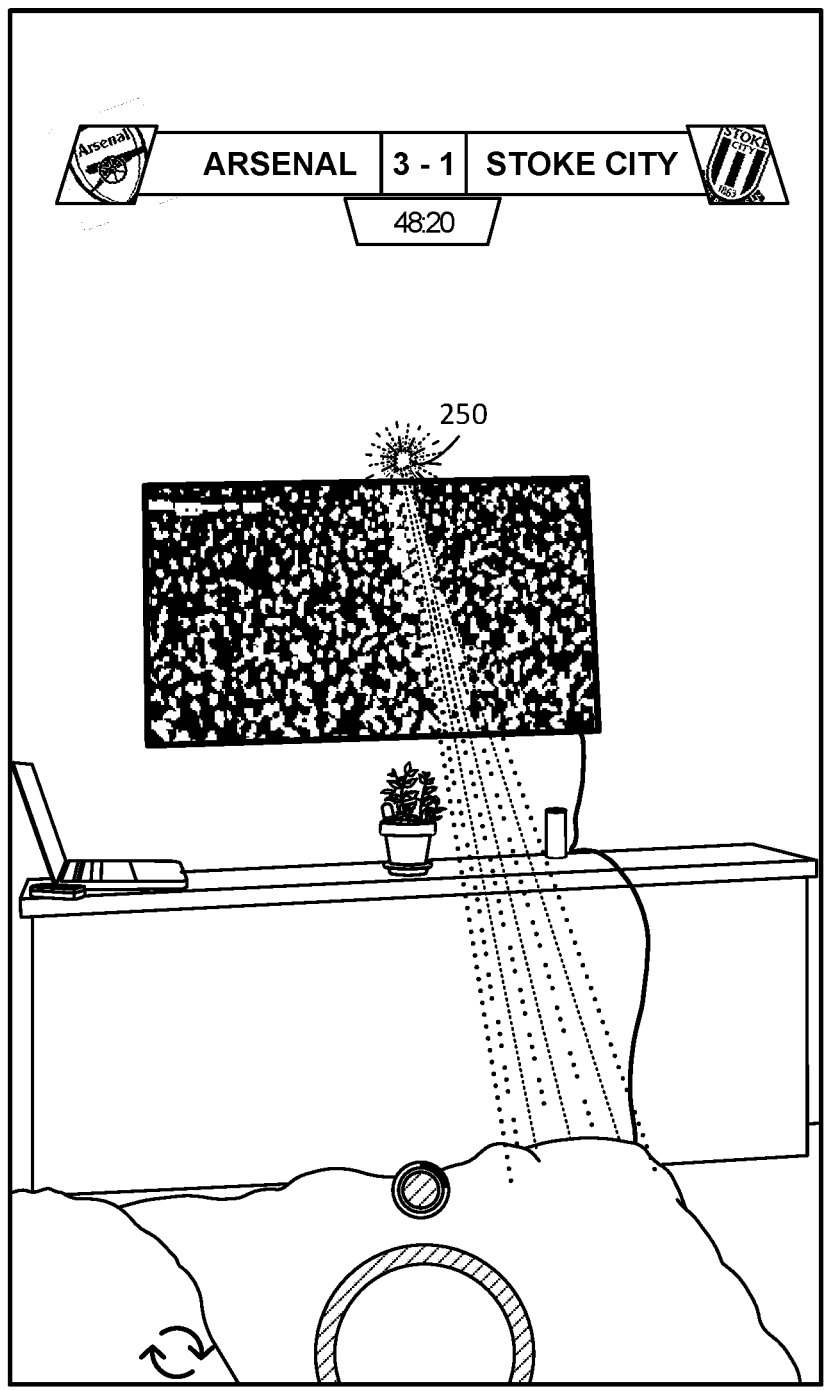
FIG. 2E depicts another example of one or more effects being output via a camera application.

FIGS. 2D, 2E, and 2F depict other examples of target applications and third party authored effects that may be output via the target applications. For example, in the embodiment depicted in FIG. 2D, the target application is the camera application and the effects include information 240 about a match being played and also rocket effect 246. The match information 240 includes information identifying the teams (Arsenal and Stoke City), the match score (3-1), and timeline (48:18) of the match. This data is provided by a third party and showed along with the media content captured and output by the camera application. The third party that provides the data can be different than the third party that authored the effects. For example, the third party can be a service that provides scores through an application programming interface (API). In such an example, a script executing to output the effects can call the API to receive the data whenever the script indicates. By using the service, the script can have access to real-time information that is updated by the service, rather than static information and/or data included in the script. Similarly, the data can be from the provider of the effects. For example, data can be updated by the provider of the effects such that the data includes real-time updates. In certain embodiments, the displayed effects data may be updated in real time. For example, the match timeline and the score on FIG. 2D may be updated in real time.

In some examples, the effect may be such that it is activated based on a user interaction or input and may include animation. For example, given the effects shown in FIG. 2D, upon the user touching the rocket 246 (e.g., touching the area of the display where the rocket is displayed), an animation effect may be initiated, as depicted in FIG. 2E), where the rocket flies towards the TV screen displayed by the camera application's GUI and then explodes (reference 250 in FIG. 2E).

Figure 3:
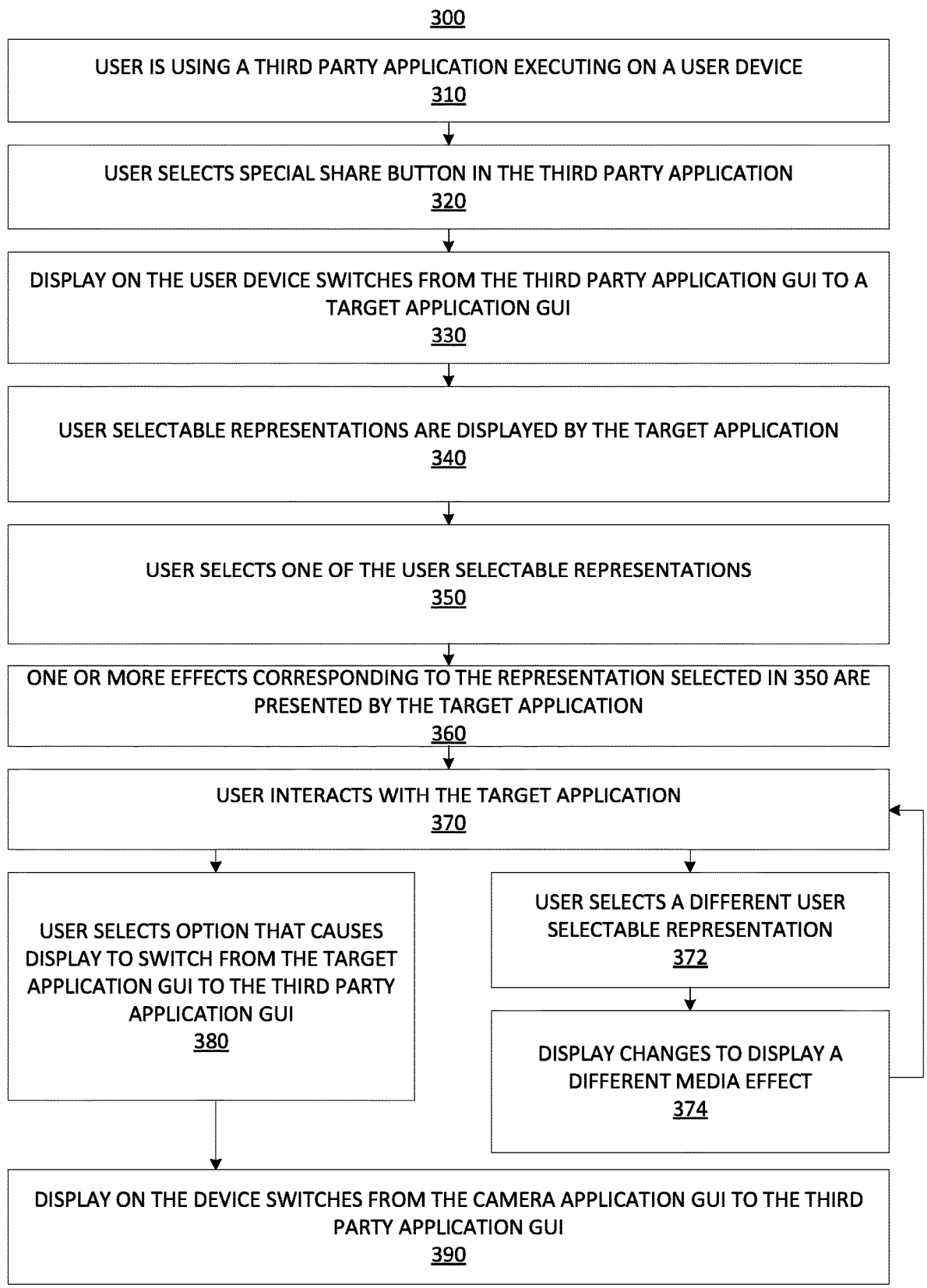
FIG. 3 depicts another example workflow showing a user's experience according to an embodiment.

FIG. 3 depicts another example workflow showing a user's experience according to an embodiment. The flow presented in FIG. 3 and described below is intended to be illustrative and non-limiting. The particular series of steps depicted in FIG. 3 is not intended to be limiting.

Figure 4A:
FIG. 4A depicts multiple representations in a graphical user interface of a camera application.

Steps 310, 320, and 330 correspond to steps 110, 120, and 130 depicted in FIG. 1 and described above. Unlike the example depicted in FIG. 1 and described above, in this example, there may be multiple bundles or sets of effects that may be candidates for being output by the target application. The multiple bundles may be created or authored by one or more third parties. In this scenario, the target application may identify multiple scripts corresponding to the multiple sets or bundles. At 340, the target application may display through its GUI user-selectable representations for each of the bundles, where the representations may be in the form of thumbnails, icons, buttons, etc. For example, as depicted in FIG. 4A, multiple representations 402, 404, 406, 408, 410, and 412 may be displayed. The representations may be displayed as a scrollable list. Each representation corresponds to a particular script and a corresponding particular set of effects.

Figure 4B:
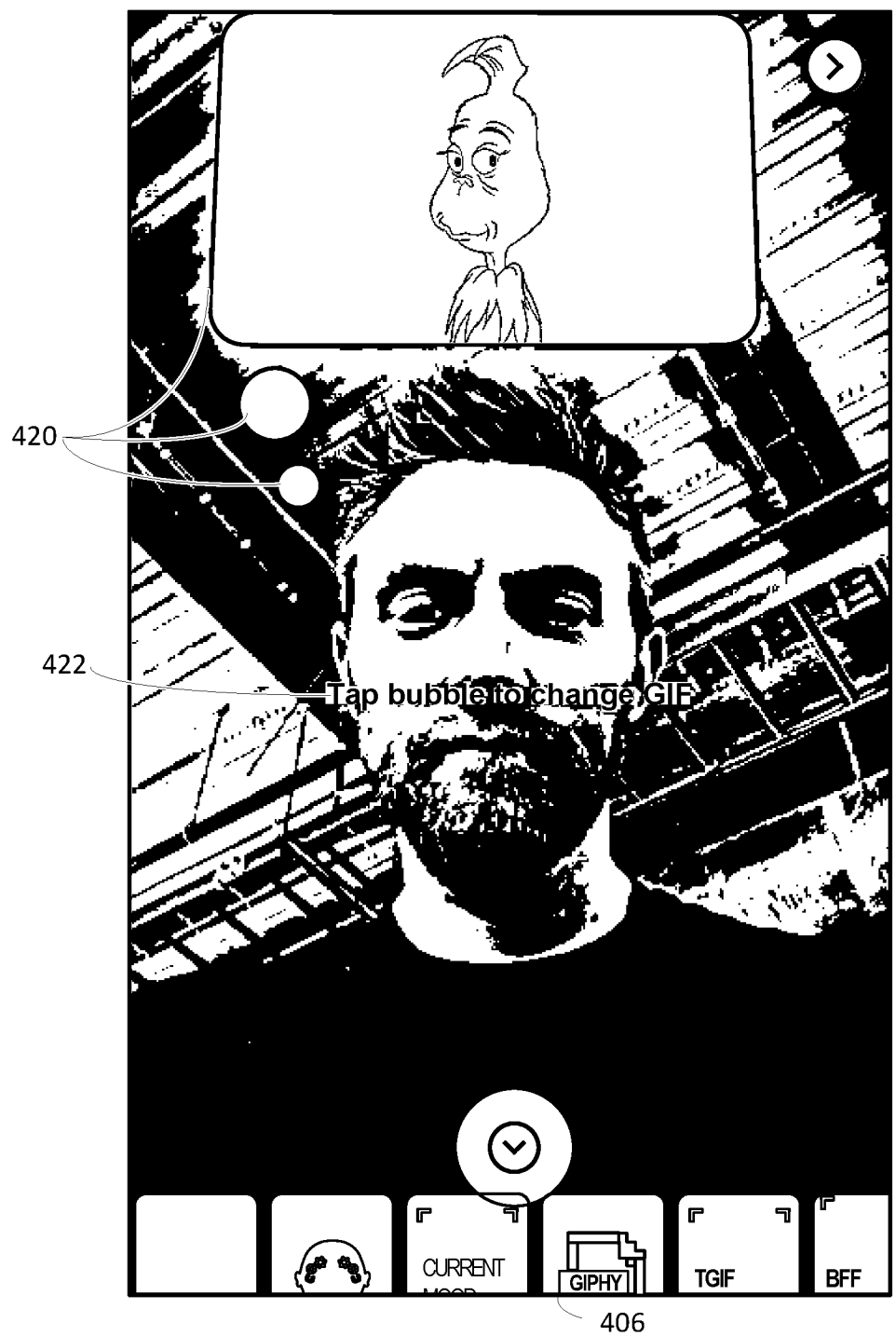
FIG. 4B depicts an example of a user selecting a representation.
Figure 4C:
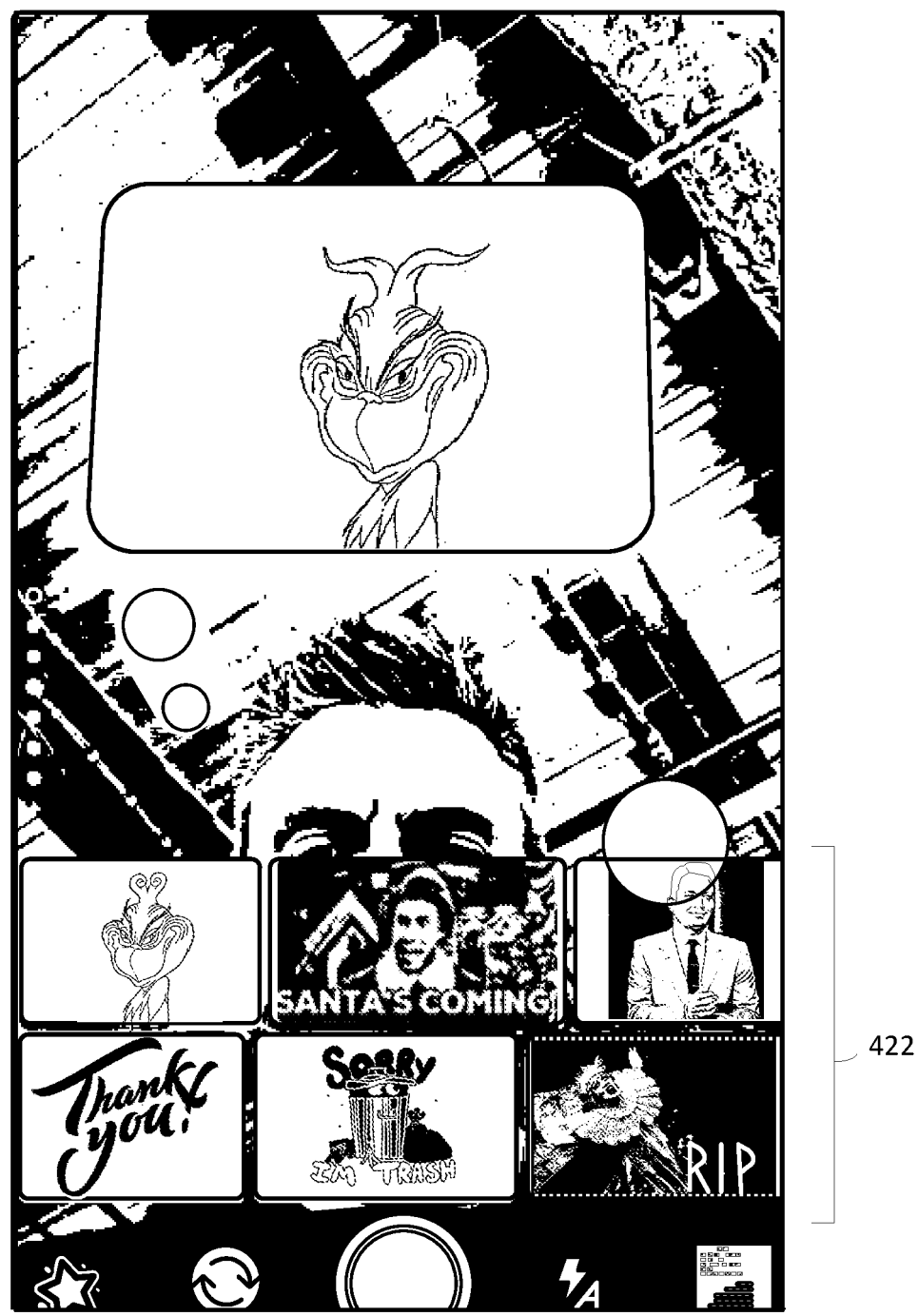
FIG. 4C depicts an example of a result of a user selecting a representation.
Figure 4D:
FIG. 4D depicts a result of one or more effect being modified by a user interaction.

At 350, the user may then select a particular representation from the multiple representations thereby indicating that the user would like the target application to output one or more effects corresponding to the selected representation. At 360, the one or more effects corresponding to the representation selected by the user in 350 are output by the target application. The visual and data display effects may be output via a GUI of the target application and the audio effects may be output via an audio output subsystem of the user's device. For example, as depicted in FIG. 4B, the user has selected representation 406 and effects 420 corresponding to the selected representation are output. The selected effects also allow the user to change the GIF shown in the effect by tapping 422, which in turn displays a set of GIFs 424. The user can then select a particular GIF that is then displayed in the effect as depicted in FIGS. 4C and 4D.

At 370, the user may interact with the target application. These interactions may include, for example, taking pictures, capturing videos, sharing the captured pictures and/or videos, etc. using the target application such as the camera application. The user interactions in 360 may also include selecting a different representation or exiting the target application. Different actions may be taken depending on the user interaction.

For example, at 372, the user may select a different representation from the previously selected representation. In response, at 374, the one or more effects corresponding to the representation selected in 374 are output by the target application and the user's device.

At 380, the user may select an option that causes the display of the user device to switch from the target application back to the third party application. For example, the user may select an exit button, cancel button, store/share and exit button, etc. provided by the target application GUI. In response to the selection, at 390, display on the user device can switch from the target application to the third party application. The target application may be closed.

In the scenario where there are multiple sets of effects, in certain embodiments, a certain set may be tagged as the "default" and the effects corresponding to this default set may be output via the target application even before the user has specifically selected a particular representation in 350 above. Once the multiple representations are displayed, the user can always select a different representation to change the effects that are output from the default to the particular user-selected set.

Figure 5:
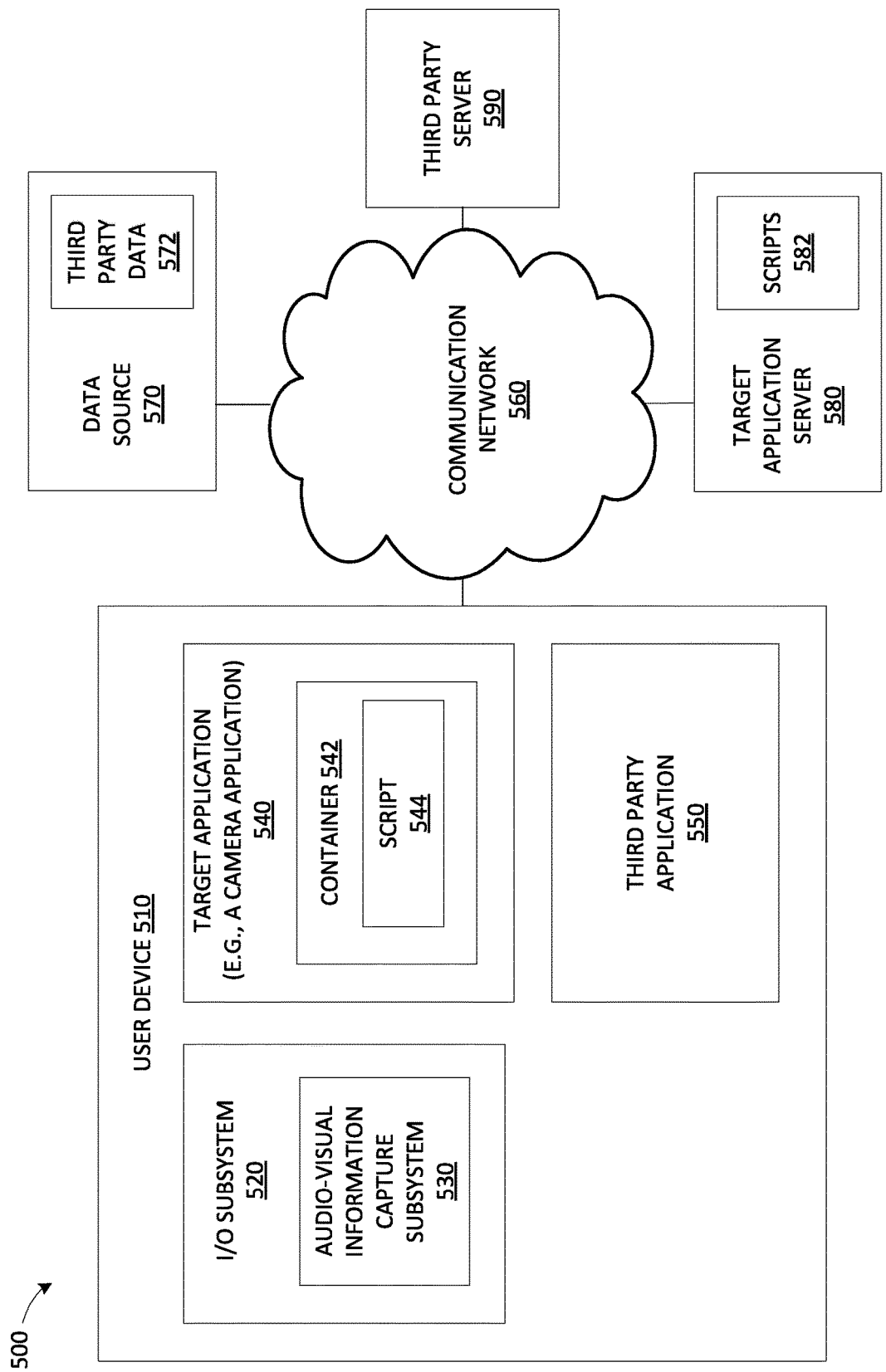
FIG. 5 is a simplified block diagram of a distributed environment that may implement an exemplary embodiment.

FIG. 5 is a simplified block diagram of a distributed environment 500 that may implement an exemplary embodiment. Distributed environment 500 may comprise multiple systems communicatively coupled to each other via one or more communication networks 560. The systems as shown in FIG. 5 include a user device 510, a third party server 590, a data source 570, and a target application server 580. Distributed environment 500 depicted in FIG. 5 is merely an example and is not intended to unduly limit the scope of inventive embodiments recited in the claims. One of ordinary skill in the art would recognize many possible variations, alternatives, and modifications. For example, in some implementations, distributed environment 500 may have more or fewer systems than those shown in FIG. 5, may combine two or more systems, or may have a different configuration or arrangement of systems.

Communication network 560 facilitates communications between the various systems depicted in FIG. 5. Communication network 560 can be of various types and can include one or more communication networks. Examples of communication network 560 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk®, Bluetooth®, and other protocols. In general, communication network 508 may include any infrastructure that facilitates communications between the various systems depicted in FIG. 5.

A user may use user device 510 to interact with applications executed by user device 510, including a third party application 550 and a target application (e.g., camera application 542). User device 510 can be a mobile device (e.g., an iPhone™ device, iPad™ device), a desktop computer, a laptop computer, or other computing device. User device 510 can include multiple subsystems including an input and/or output (I/O) subsystem 520. I/O subsystem 520 may include one or more subsystems 530 for capturing audio and/or video information.

I/O subsystem 520 may include components for inputting and/or outputting data to or from the user device 510. For example, I/O subsystem 520 can include a screen for displaying content on the user device 510 and receiving interactions through one or more touch sensors. As another example, the I/O subsystem 520 can further include one or more components such as a Global Positioning System (GPS), accelerometer, keyboard, speaker, or the like.

User device 510 may further include an audio-visual information capture subsystem 530 for capturing audio and/or video information. Audio-visual information capture subsystem 520 may include, for example, one or more cameras for capturing images or video information, one or more microphones for capturing audio information, and the like.

One or more applications may be installed on the user device 510 and may be executed by the user device 510. While FIG. 5 depicts only a third party application 550 and a target application 540, this is not intended to be limiting, other applications may also be installed and executed by the user device 510. As an example, a social media application (such as Facebook™ application) may be installed and executed by the user device 510. In certain embodiments, target application 540 may be part of a social media application. However, it should be recognized that the target application 540 can be separate from the social media application.

As depicted in FIG. 5, as one example, the target application may be a camera application that can receive and output one or more images, a video, a video stream, and/or audio information captured by the audio-visual information capture subsystem 530.

The target application 540 can determine an effect to mix with the output of the target application 540. For example, the target application 540 can receive a message indicating a third party application (such as the third party application 550), a particular media effect, a keyword for identifying one or more media effects, or the like.

Based on the message, the target application 540 can cause a script (such as a script 542) to be executed in a container 544 (sometimes referred to as a sandbox) of the target application 540. In some examples, one or more effects can be presented by the target application 540 based on execution of the script 544, which can include one or more operations. The script 544 can be authored by a user not associated with the target application 540. For example, a user associated with the third party application 550.

In some examples, the script 544 can cause the target application 540 to communicate with one or more remote sources (e.g., a data source 570, a target application server 580, or a third party server 590). The data source 570 can be associated with the target application server 580, the third party server 590, or another server. The data source 570 can be a database that at least includes third party data 572 (e.g., data associated and/or from the third party application 550). In some examples, the data source 570 can include live data that can be used by a script authored by the third party application 550. The target application server 580 can communicate with the target application 540 for providing server side functionality that supplements processing and storage on the user device 510. The third party server 590 can perform similar functionality as the social media server 580, but for the third party application 550 rather than the target application 540. The target application server 580 can also include one or more scripts 582 for sending to the target application 540 for execution.

As described above, the third party application 550 may send a message to the target application 540. To send the message, the third party application 550 can use an application programming interface (API) provided by a provider of the target application 540. The API can enable third party applications to perform various tasks such as: provide third party application data to the target application 540, provide scripts authored by a provider of the third party application 550 to the target application 540, initiate execution of the scripts, etc.

FIG. 6 is a simplified flowchart 600 depicting processing performed by a third party application according to certain embodiments. The processing depicted in FIG. 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 6 and described below is intended to be illustrative and non-limiting. The particular series of processing steps depicted in FIG. 6 is not intended to be limiting.

At 610, a third party application executing on a user device may receive an indication that the user has selected a special button provided by the third party application to initiate sharing with a target application. In some examples, selection of the special button may indicate that a user would like to share data from the third party application with the target application, such as a camera application.

At 620, the third party application determines information (e.g., third party data) to be sent from the third party application to the target application. In certain embodiments, the information to be sent is such that it enables the target application to determine a script based on the content, where the script encodes one or more effects to be output via the target application. In certain embodiments, the script itself or information identifying the script (e.g., file name) may be included in the information to be sent. In another embodiment, the third party application may include sufficient information (e.g., an identifier identifying the third party application or a provider of the third party application) in the communication that enables the target application to determine a script corresponding to the communication.

As described above, the one or more effects may also include outputting third party data. In one embodiment, as part of 620, the third party application may determine what third party data is to be sent to the target application and include that data in the communication to be sent to the target application. In some other embodiments, the data to be output may be identified by the script. The third party data may be stored by on the user device or may be stored on some storage location remote from the user device. For example, for the third party application depicted in FIG. 2A, the third party application may determine that information indicative of a route run by the user and information indicative of the distance run by the user is to be communicated to the target application. At 630, the information determined in 620 is communicated from the third party application to the target application, which may also be executing on the user's device.

At 640, the third party application may enable the user device to switch from displaying the GUI of the third party application to displaying the GUI of the target application. In some examples, the switch can be a quick switch such that a user does not need to perform any action to have the switch occur.

After the user has exited the target application, at 650, the third party application may receive a message to again become the active application and as a result the display on the user's device may switch from displaying the GUI of the target application to displaying the GUI of the third party application.

FIG. 7 is a simplified flowchart 700 depicting processing performed by a target application according to certain embodiments. The processing depicted in FIG. 7 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 7 and described below is intended to be illustrative and non-limiting. The particular series of processing steps depicted in FIG. 7 is not intended to be limiting.

At 710, a target application may receive a message or communication from a third party application executing on a device. The communication may include information that enables the target application to identify a script to be executed. For example, in some embodiments, the communication itself may comprise information identifying the script or may even include the script. In some embodiments, the communication may include information identifying the third party application or a third party provider of the third party application. The communication may include keywords, etc. In some examples, the received communication or message may include information identifying third party data to be included in one or more effects associated with the script.

At 720, the target application may be made an active application on the device. For example, display of the device can switch from a GUI of the third party application to a GUI of the target application.

At 730, the target application may identify a script based on the message received in 710. In certain embodiments, the target application may access information that identifies the script to use based on information contained in the message. For example, the target application may access information that maps third party applications to corresponding scripts. Accordingly, based on the information identifying the third party application included in the message, the target application may determine the script to use. As previously indicated, in some instances, the message itself may identify the script to use.

The task of identifying a script corresponding to a message received from a third party application may be performed by the target application by itself if the requisite information and the script is accessible to the target application. Alternatively, the processing may be performed by the target application in conjunction with a server. For example, as part of 730, the target application executing on a user device may send information contained in the communication, or a portion thereof, to a server, such as to target application server 580 depicted in FIG. 5. The server may then perform processing to identify a particular script based on the received communication and then send the identified script to the user device where the target application is executing.

At 740, the identified script may be executed by the target application, where execution of the script causes one or more effects encoded by the script to be output by the target application. The one or more effects may include audio effects, visual or video effects, and/or displaying data. In some examples, the effects may be output along with other information output by the target application. For example, if the target application is a camera application that is configured to capture and output media information such as video information, the effects may be shown along with (e.g., mixed with) the information output by the target application. In this manner, the content output by the target camera application is augmented by the one or more effects.

In certain embodiments, the script is a JavaScript file that is executed by the target application. In some embodiments, the script may be executed within a sandbox container within the target application so that the script is cordoned off from and does not have access to any information of the target application.

In certain embodiments, the script may indicate that data, such as third party data, is to be output as part of the one or more effects. In some examples, the data to be displayed may be included in the message received by the target application from the third party application. In some other examples, the script may include references or pointers to the data, and the target application may use these references to access the data. For example, in one embodiment, the script may include a uniform resource identifier (URI) such as a URL that points to a location where the data to be included in the effects is stored. The location may be remote from the device where the target application is being executed, for example, the data may be stored on data source 570 depicted in FIG. 5. As part of script execution, the target application may determine the URL and download the data from the location pointed to by the URL.

At 750, the target application may receive inputs (e.g., user interactions) from the user. At 760 and 770, if the user input is to exit from the target application, then the target application may be closed (or made not active) such that the third party application becomes the active application and the display on the user device is switched from the target application to the third party application. When the input does not cause an exit from the target application, the target application can wait for another user interaction.

Figure 8:
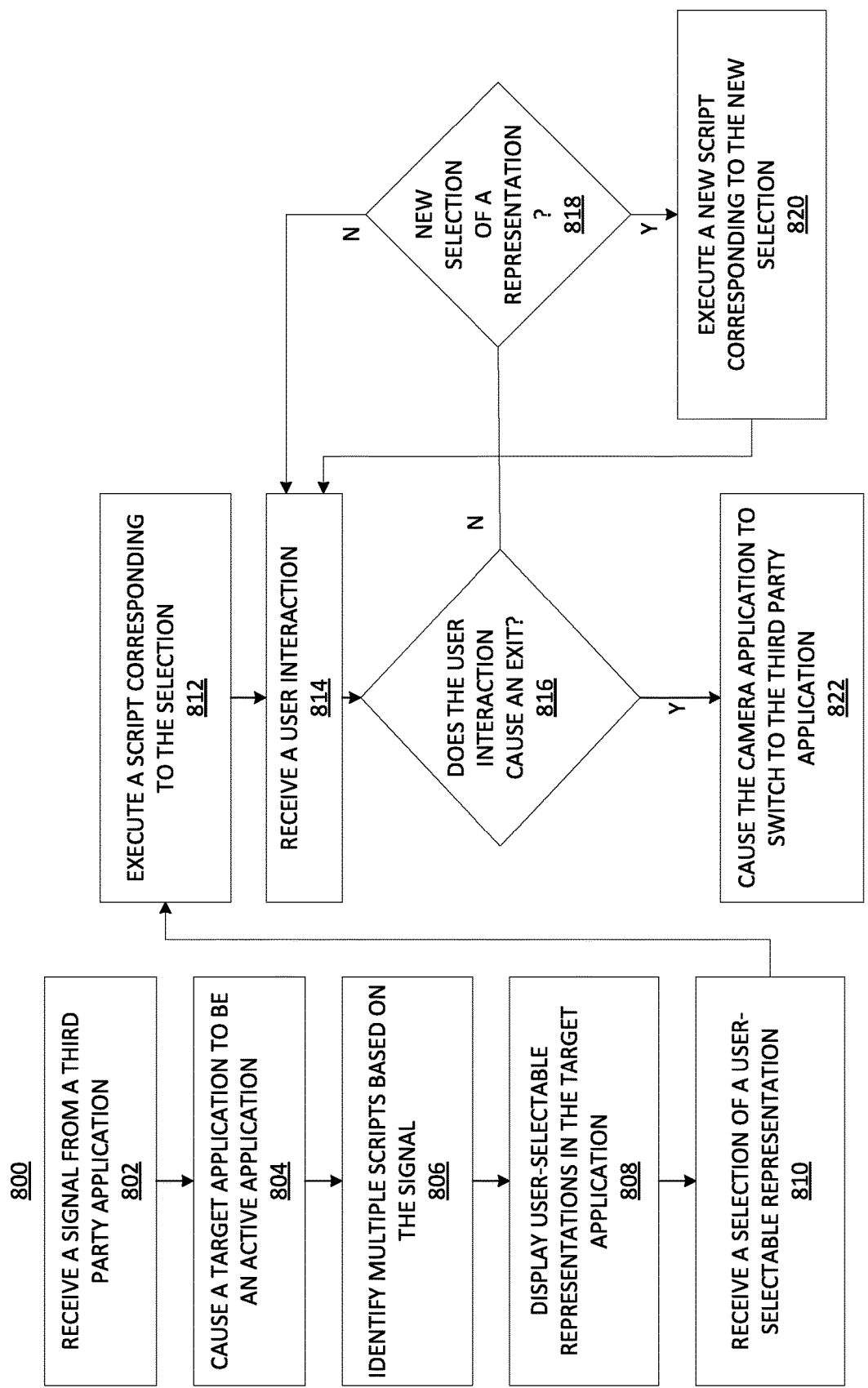
FIG. 8 is a simplified flowchart depicting processing performed for multiple sets of effects by a target application according to certain embodiments.

FIG. 8 is a simplified flowchart 800 depicting processing performed for multiple sets of effects by a target application according to certain embodiments. The processing depicted in FIG. 8 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 8 and described below is intended to be illustrative and non-limiting. The particular series of processing steps depicted in FIG. 8 is not intended to be limiting.

At 802, a target application may receive a message or communication from a third party application executing on a device. The message may include information that enables the target application to identify multiple scripts to be executed. For example, in some embodiments, the message itself may comprise information identifying the multiple scripts or may even include the multiple scripts (or include one or more of the multiple scripts). In some embodiments, the message may include information identifying the third party application or a third party provider of the third party application. The message may include keywords, etc. In some examples, the message may include information identifying third party data to be included in one or more effects associated with at least one of the multiple scripts.

At 804, the target application may be made an active application on the device. For example, display of the device can switch from a GUI of the third party application to a GUI of the target application.

At 806, the target application may identify multiple scripts based on the message received in 802. In certain embodiments, the target application may access information that identifies the multiple scripts to use based on information contained in the message. For example, the target application may access information that maps third party applications to corresponding scripts. Accordingly, based on the information identifying the third party application included in the message, the target application may determine the multiple scripts. As previously indicated, in some instances, the message itself may include the multiple scripts.

The task of identifying a script corresponding to the message received from a third party application may be performed by the target application by itself if the requisite information and the script is accessible to the target application. Alternatively, the processing may be performed by the target application in conjunction with a server. For example, as part of 806, the target application executing on a user device may send information contained in the message, or a portion thereof, to a server, such as to target application server 580 depicted in FIG. 5. The server may then perform processing to identify a particular script based on the received information and then send the identified script to the user device where the target application is executing.

At 808, user-selectable representations can be displayed in the target application. Each user-selectable representation can correspond to a script that was identified based on the message. The representations may be in the form of thumbnails, icons, buttons, etc. At 810, a user can make a selection of a user-selectable representation. The selection can be received by the target application.

At 812, the script corresponding to the selection may be executed by the target application, where execution of the script causes one or more effects encoded by the script to be output by the target application. The one or more effects may include audio effects, visual or video effects, and/or displaying data. In some examples, the effects may be output along with other information output by the target application. For example, if the target application is a camera application that is configured to capture and output media information such as video information, the effects may be shown along with (e.g., mixed with) the information output by the target application. In this manner, the content output by the target camera application is augmented by the one or more effects.

In certain embodiments, the script is a JavaScript file that is executed by the target application. In some embodiments, the script may be executed within a sandbox container within the target application so that the script is cordoned off from and does not have access to any information of the target application.

In certain embodiments, the script may indicate that data, such as third party data, is to be output as part of the one or more effects. In some examples, the data to be displayed may be included in the message received by the target application from the third party application. In some other examples, the script may include references or pointers to the data, and the target application may use these references to access the data. For example, in one embodiment, the script may include a uniform resource identifier (URI) such as a URL that points to a location where the data to be included in the effects is stored. The location may be remote from the device where the target application is being executed, for example, the data may be stored on data source 570 depicted in FIG. 5. As part of script execution, the target application may determine the URL and download the data from the location pointed to by the URL.

At 814, the target application may receive inputs (e.g., user interactions) from the user. At 816 and 822, if the user input indicates to exit from the target application, then the target application may be closed (or made not active) such that the third party application becomes the active application and the display on the user device is switched from the target application to the third party application.

At 818, when the input does not cause an exit from the target application, it can be determined whether the input is a new selection of a user-selectable representation. At 820, if the new selection is of a user-selectable representation, a new script corresponding to the new selection can be executed similarly as described at 812. When the new script is executed, the previous script might no longer be executing on the device (and accordingly, the one or more effects corresponding to the previous script may no longer be output by the device).

Figure 9A:
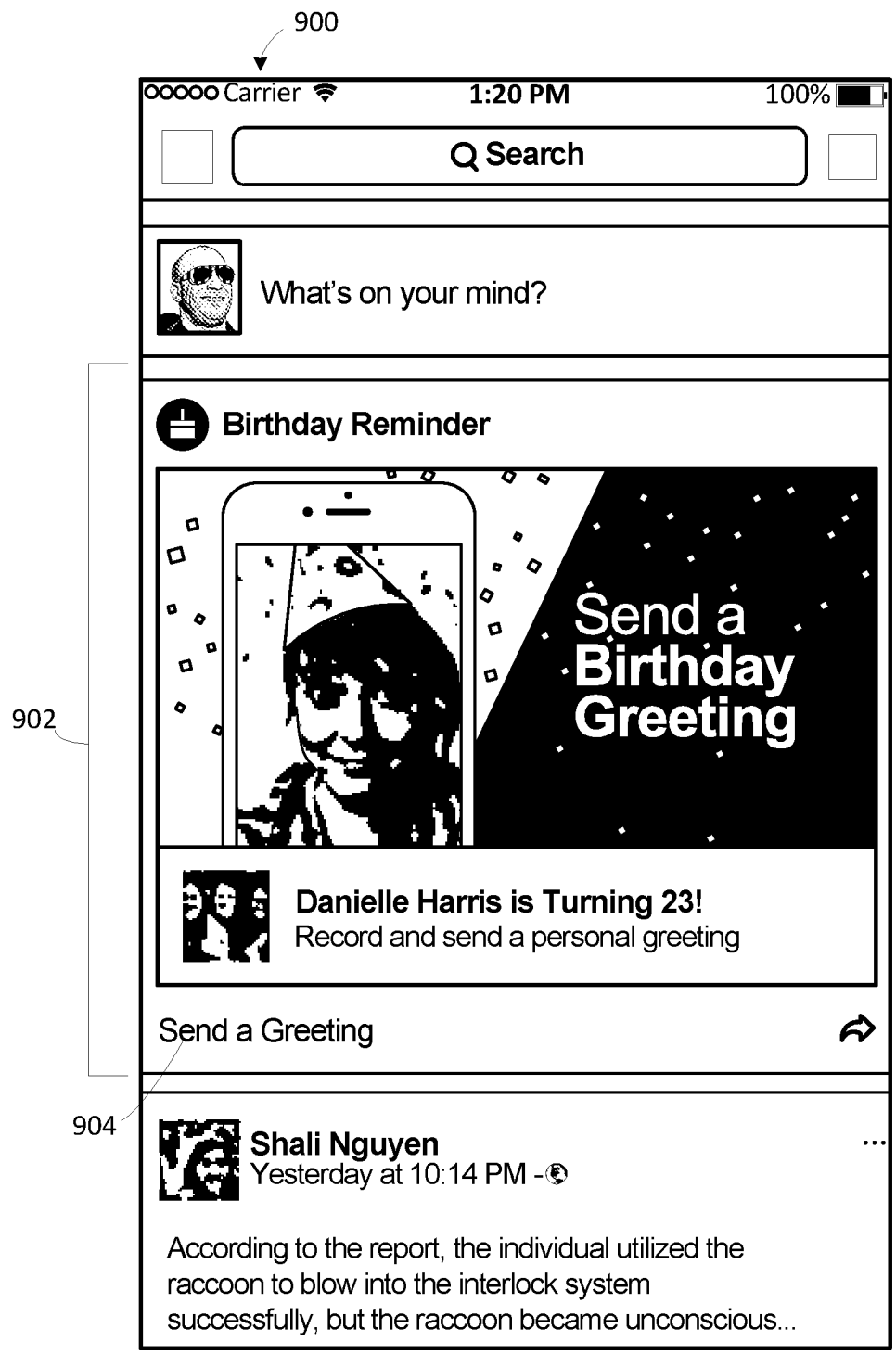
FIG. 9A depicts an example graphical user interface (GUI) for a third party social media application that may be displayed on a user device.
Figure 9B:
FIG. 9B depicts an example graphical user interface (GUI) for a target application that may be displayed on a user device.

FIG. 9A-9E depict examples of GUIs for a workflow of posting content to a third party application using a target application. FIG. 9A depicts an example GUI 900 for a third party social media application that may be displayed on a user device. GUI 900 includes a birthday reminder 902 for a friend of a user along with a special share button 904 (e.g., "Send a Greeting"). The special share button can cause the third party social media application to share data and switch to a target application (e.g., a camera application), where effects that are authored by a third party provider can be shown. As one example, selection of button 904 causes a target camera application to be invoked and its GUI 910 to be displayed on the user's device, as illustrated in FIG. 9B.

Figure 9C:
FIG. 9C depicts an example of one or more effects being output by a graphical user interface (GUI) for a target application that may be displayed on a user device.

The target camera application may determine that there are multiple bundles or sets of effects, authored or created by one or more third parties, and which are candidates for selection by the user. Multiple representations 912 corresponding to multiple bundles or sets of effects are displayed in GUI 910. The user may then, via GUI 910, select a particular representation. The camera target application then executes the script corresponding to the selected representation and the one or more effects generated from executing the particular script are then output via GUI 910 as shown in FIG. 9C. As depicted in FIG. 9C, the target camera application displays a video of a person captured using a front facing camera on the user device, and the effects include displaying a pair of birthday goggles with candles over the eyes of the face of the person.

In the embodiment depicted in FIG. 9C, the selected representation corresponds to multiple effects and the user can scroll from one effect to the other by swiping on the screen. While the graphical user interface illustrates the multiple media effects at the bottom of the graphical user interface, it should be recognized that the multiple media effects can be represented in other ways. For example, each media effect can be associated with a different screen of the graphical user interface such that a different media effect is presented when a user interaction causes a screen of the graphical user interface to change (e.g., swiping a finger from one side of a screen to another side). When a media effect is activated (as described above), the media effect can be presented by the target application (as illustrated in FIG. 9C).

Figure 9D:
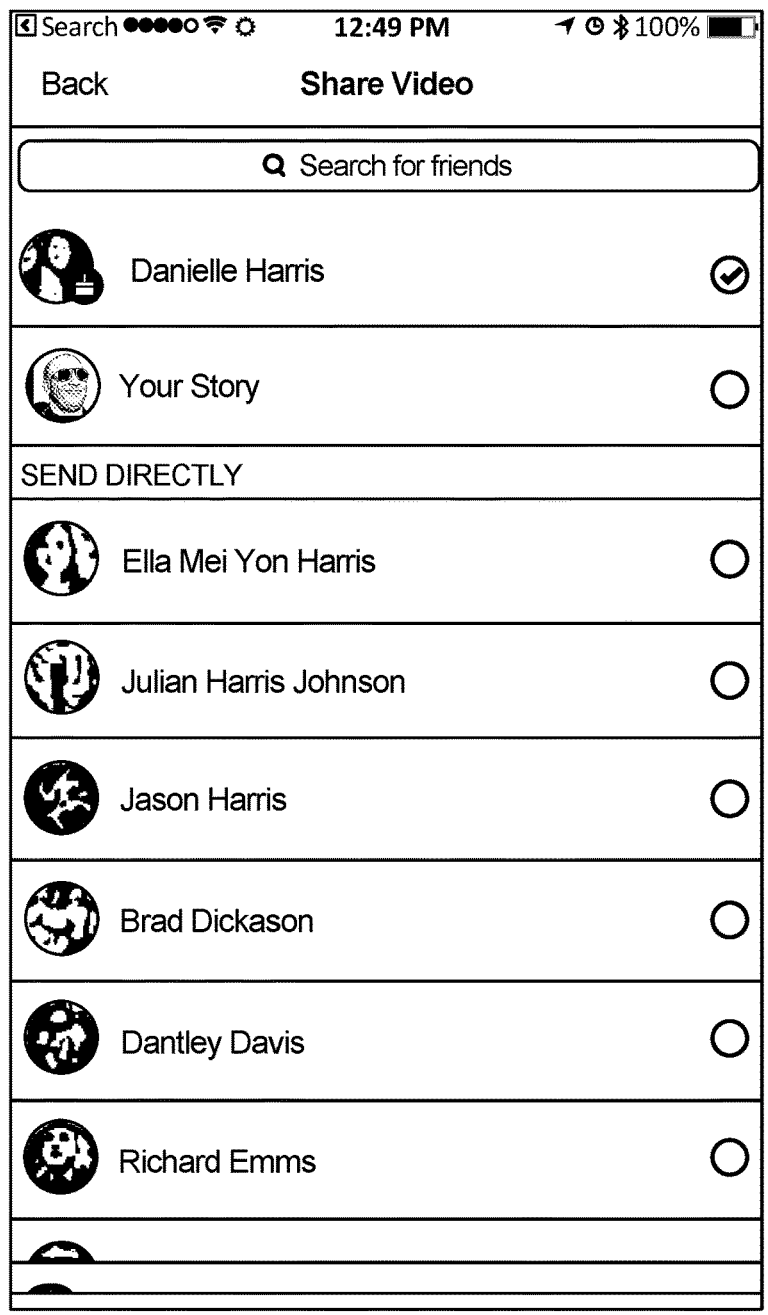
FIG. 9D depicts a graphical user interface (GUI) for sharing media content.
Figure 9E:
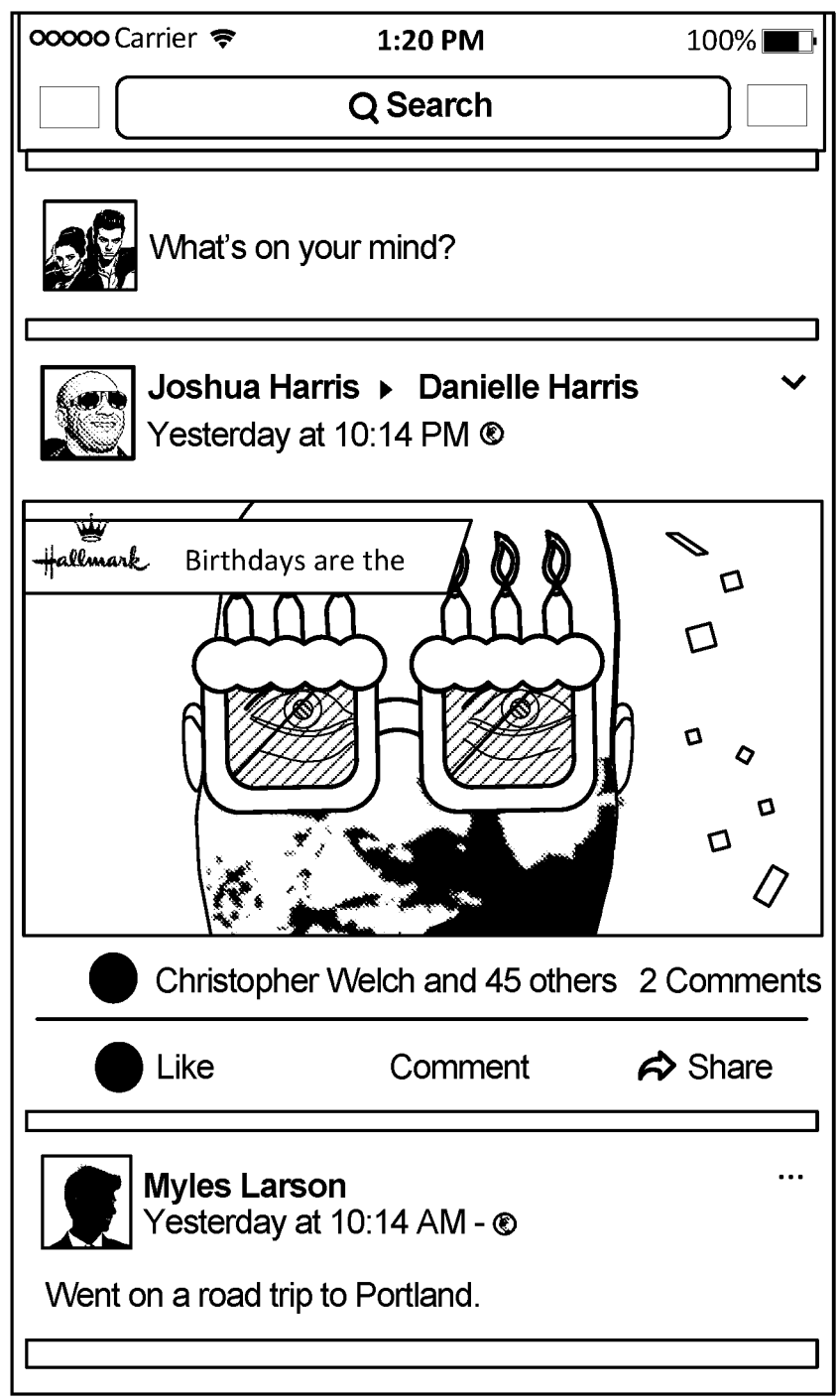
FIG. 9E depicts a graphical user interface (GUI) for a social media application with media content being shared.

FIG. 9D depicts a graphical user interface (GUI) for sharing media content. In some examples, the GUI for sharing media content can be hosted by the target application. In other examples, the GUI for sharing media content can be hosted by the third party social media application. The graphical user interface for sharing media content can allow a user to select one or more users to share the media content with. After an indication to share the media content with one or more users is made, the media content can be sent to the one or more users (as illustrated in FIG. 9E). In FIG. 9E, a single user was selected to share the media content with (i.e., Danielle Harris). The media content is places on a wall of Danielle Harris such that Danielle Harris can see the media content, which includes one or more images from an image/video capture subsystem mixed with a media effect.

As described above, this disclosure herein allows a third party to create an experience to run inside a virtual reality software camera in Facebook, then directly drive users to that in-camera experience from either a mobile app or a web link. This disclosure also allows the third party to send information at the time the share is initiated so that external data can be merged into the camera experience. Because third party Facebook applications (which can be mobile apps, or web services) are linked to third party effects, this disclosure allows a system to automatically provide identity information (e.g. email address, public profile information about the current viewer) to the code running to produce the third party effect, even when the current user of the third party effect found the third party effect inside Facebook (e.g. they were not initiated via an external share).

Figure 10:
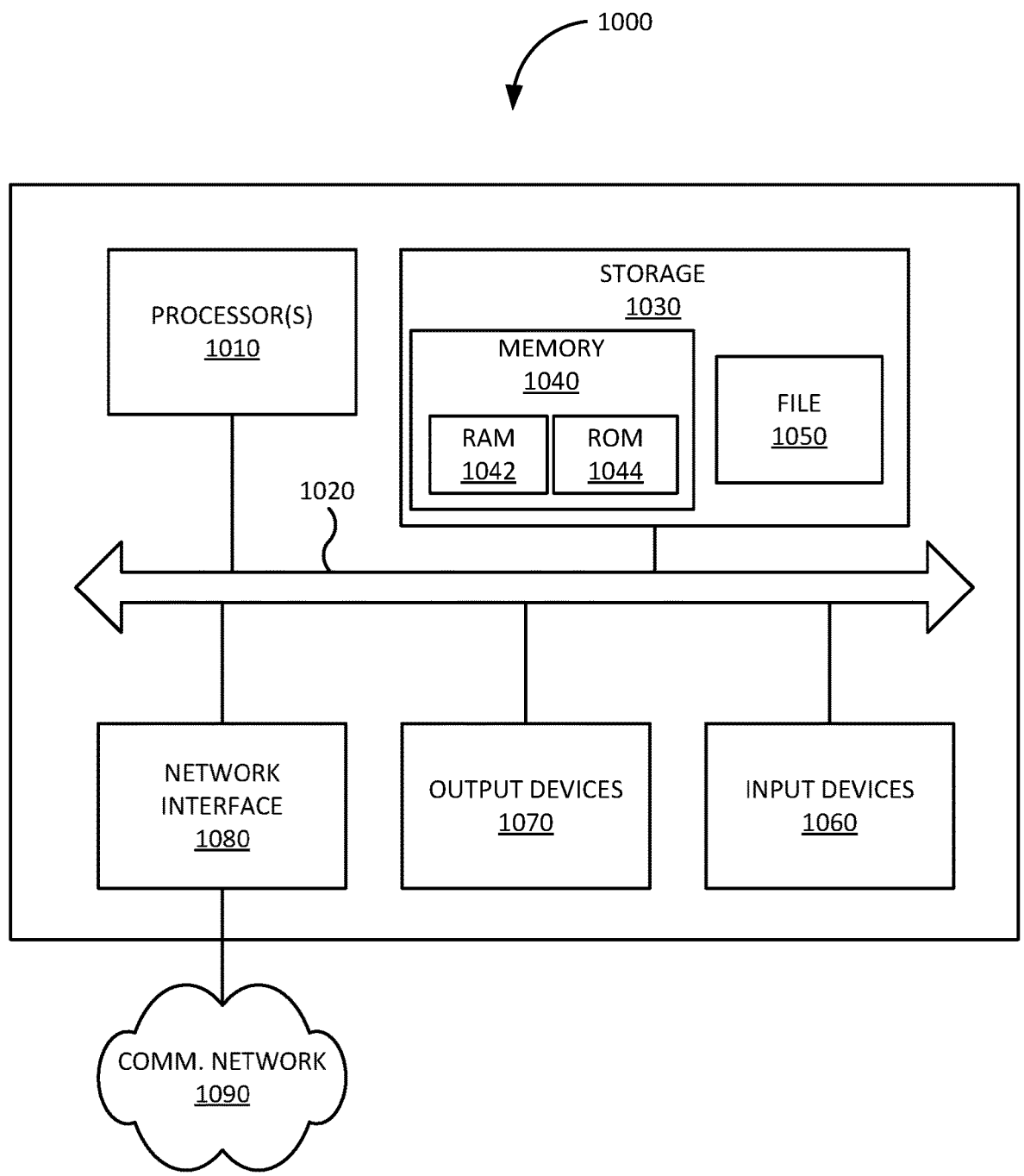
FIG. 10 illustrates an example of a block diagram for a computer system.

FIG. 10 illustrates an example of a block diagram for a computer system. The computer system shown in FIG. 10 can be used to implement one or more of the following elements of FIG. 5: the user device 510, the data source 570, the target application server 580, and the third party server 590. In this example, the computer system 1000 includes a monitor 1010, computer 1020, a keyboard 1030, a user input device 1040, one or more computer interfaces 1050, and the like. In the present example, the user input device 1040 is typically embodied as a computer mouse, a trackball, a track pad, a joystick, wireless remote, drawing tablet, voice command system, eye tracking system, and the like. The user input device 1040 typically allows a user to select objects, icons, text and the like that appear on the monitor 1010 via a command such as a click of a button or the like.

Examples of the computer interfaces 1050 typically include an Ethernet card, a modem (telephone, satellite, cable, ISDN), (asynchronous) digital subscriber line (DSL) unit, FireWire interface, USB interface, and the like. For example, the computer interfaces 1050 may be coupled to a computer network 1055, to a FireWire bus, or the like. In other embodiments, the computer interfaces 1050 may be physically integrated on the motherboard of the computer 1020, may be a software program, such as soft DSL, or the like.

In various examples, the computer 1020 typically includes familiar computer components such as a processor 1060, and memory storage devices, such as a random access memory (RAM) 1070, disk drives 1080, and system bus 1090 interconnecting the above components.

The RAM 1070 and disk drive 1080 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various examples, the computer system 1000 may also include software that enables communications over a network such as the HTTP, TCP/IP, RTP/RTSP protocols, and the like. In alternative embodiments of the present invention, other communications software and transfer protocols may also be used, for example IPX, UDP or the like.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   displaying, by a device, a first graphical user interface (GUI) of a first application executing on the device, the first GUI providing a user-selectable option for initiating a communication from the first application to a second application, wherein the communication includes a script encoded with one or more effects or information identifying the script, each effect of the one or more effects being an audio-visual effect that can be applied by the second application;
   sending, by the first application, the communication from the first application to the second application in response to a selection of the user-selectable option; and
   receiving, by the second application executing on the device, the communication from the first application executing on the device;
   displaying, by the device, a second GUI of the second application, wherein the second GUI includes media content captured by one or more cameras of the device, and wherein the media content is captured by the one or more cameras after the second application has received the communication;
   identifying the script based on the communication; and
   executing, by the second application, the identified script, the executing causing the one or more effects to be output along with the media content such that the media content is augmented by the one or more effects.

2. The method of claim 1, wherein the script is authored by a provider of the first application, and wherein the provider of the first application is different from a provider of the second application.

3. The method of claim 1, wherein causing the one or more effects to be output comprises:
   outputting a visual effect via the second GUI,
   outputting an audio effect via the device, or
   displaying data associated with the first application via the second GUI.

4. The method of claim 1, wherein identifying the script comprises:
   communicating, from the second application to a server system remote from the device, a portion of information included in the communication received by the second application;
   identifying, by the server system, the script based on the portion of information; and
   communicating the identified script from the server system to the device for use by the second application.

5. The method of claim 1, wherein the information identifying the script includes information identifying the first application or information identifying a provider of the first application.

6. The method of claim 1, wherein causing the one or more effects to be output comprises outputting, via the second GUI, data associated with the first application.

7. The method of claim 6, wherein the data associated with the first application is included in the communication received by the second application from the first application.

8. The method of claim 6, wherein:
   the data associated with the first application is accessed by the second application from a storage location remote from the device; and
   the script identifies the storage location.

9. The method of claim 8, wherein the script is authored by a provider of the first application, and wherein the data associated with the first application is from a provider other than the provider of the first application.

10. The method of claim 1,
    wherein displaying the second GUI comprises switching the GUI displayed by the device from the first GUI to the second GUI.

11. The method of claim 10 further comprising:
    receiving, by the device, a message from the second application to exit the second application; and
    responsive to the message, changing the GUI displayed by the device from the second GUI to the first GUI.

12. The method of claim 1 further comprising:
    capturing one or more frames of a video stream, wherein the media content is the video stream, and wherein the one or more frames are captured by the one or more cameras of the device while the one or more effects are being output along with the video stream;
    sending, by the second application, a preview of the one or more frames of the video stream to the first application; and
    displaying, by the first application, the preview of the one or more frames of the video stream.

13. The method of claim 1, wherein displaying the second GUI comprises switching the GUI displayed by the device from the first GUI to the second GUI.

14. A non-transitory computer-readable storage medium storing a plurality of instructions executable by one or more processors of a device, the plurality of instructions when executed by the one or more processors cause the one or more processors to:
    display, by the device, a first graphical user interface (GUI) of a first application executing on the device, the first GUI providing a user-selectable option for initiating a communication from the first application to a second application, wherein the communication includes a script encoded with one or more effects or information identifying the script, each effect of the one or more effects being an audio-visual effect that can be applied by the second application;

send the communication from the first application to the second application in response to a selection of the user-selectable option; and receive, by the second application executing on the device, the communication from the first application executing on the device;

display, by the device, a second GUI of the second application, wherein the second GUI includes media content captured by one or more cameras of the device, and wherein the media content is captured by the one or more cameras after the second application has received the communication;

identify the script based on the communication; and execute, by the second application, the identified script, the executing causing the one or more effects to be output along with the media content such that the media content is augmented by the one or more effects.

15. The non-transitory computer-readable storage medium of claim 14, wherein the script is authored by a provider of the first application, and wherein the provider of the first application is different from a provider of the second application.

16. The non-transitory computer-readable storage medium of claim 14, wherein causing the one or more effects to be output comprises outputting, via the second GUI, data associated with the first application, and wherein the data associated with the first application is included in the communication received by the second application from the first application.

17. The non-transitory computer-readable storage medium of claim 14,
wherein displaying the second GUI comprises switching the GUI displayed by the device from the first GUI to the second GUI.

18. The non-transitory computer-readable storage medium of claim 17, wherein the plurality of instructions when executed by the one or more processors further cause the one or more processors to:
receive, by the device, a message from the second application to exit the second application; and
responsive to the message, change the GUI displayed by the device from the second GUI to the first GUI.

19. A system comprising:
one or more processors; and
a non-transitory computer-readable medium including instructions that, when executed by the one or more processors, cause the one or more processors to:
display, by a device, a first graphical user interface (GUI) of a first application executing on the device, the first GUI providing a user-selectable option for initiating a communication from the first application to a second application, wherein the communication includes: (1) a plurality of scripts, each script of the plurality of scripts encoded with one or more effects or (2) information identifying the plurality of scripts, and wherein each effect of the one or more effects is an audio-visual effect that can be applied by the second application;

send the communication from the first application to the second application in response to a selection of the user-selectable option; and receive, by the second application executing on the device, the communication from the first application executing on the device;

identify the plurality of scripts based on the communication;

display a second GUI of the second application, wherein the second GUI includes media content captured by one or more cameras of the device, wherein the second GUI further includes a plurality of selectable representations, each selectable representation associated with a different script of the plurality of scripts, and wherein the media content is captured by the one or more cameras after the second application has received the communication;

receive, through the second GUI, a selection of a selectable representation of the plurality of selectable representations;

identify, in response to receiving the selection, a script associated with the selectable representation; and execute, by the second application, the identified script, the executing of the identified script causing one or more effects in the identified script to be output along with the media content such that the media content is augmented by the one or more effects in the identified script.

20. The system of claim 19, wherein the non-transitory computer-readable medium further includes instructions that, when executed by the one or more processors, cause the one or more processors to:
receive, through the second GUI, a selection of a different selectable representation of the plurality of selectable representations;
identify a different script associated with the different selectable representation; and
execute, by the second application, the different script, the executing of the different script causing one or more additional effects to be output along with the media content.

* * * * *